US008375093B2

(12) United States Patent
Deluca et al.

(10) Patent No.: US 8,375,093 B2
(45) Date of Patent: Feb. 12, 2013

(54) RETAINING EMAIL RESPONSE TIME TRENDS

(75) Inventors: Lisa Seacat Deluca, Research Triangle Park, NC (US); Itzhack Goldberg, Research Triangle Park, NC (US); Ohad Greenshpan, Research Triangle Park, NC (US); Boaz Mizrachi, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 12/578,453

(22) Filed: Oct. 13, 2009

(65) Prior Publication Data

US 2011/0087742 A1 Apr. 14, 2011

(51) Int. Cl.
*G06F 15/16* (2006.01)
(52) U.S. Cl. ......... 709/206; 709/204; 709/205; 709/207
(58) Field of Classification Search .................. 709/204, 709/205, 206, 207
See application file for complete search history.

(56) References Cited

U.S. PATENT DOCUMENTS

| | | | | |
|---|---|---|---|---|
| 2004/0243679 | A1* | 12/2004 | Tyler | 709/206 |
| 2009/0037532 | A1* | 2/2009 | Estrada | 709/205 |
| 2010/0017194 | A1* | 1/2010 | Hammer et al. | 704/9 |
| 2010/0017484 | A1* | 1/2010 | Accapadi et al. | 709/206 |
| 2010/0169264 | A1* | 7/2010 | O'Sullivan et al. | 706/52 |
| 2010/0211592 | A1* | 8/2010 | Brownlee | 707/769 |
| 2010/0250682 | A1* | 9/2010 | Goldberg et al. | 709/206 |

OTHER PUBLICATIONS

Office Action dated May 10, 2012 for U.S. Appl. No. 12/578,459, Lisa Seacat Deluca et al., "Apparatus, System, and Method for Displaying Email Messages Based on Response Time Trends", filed Oct. 13, 2009.

* cited by examiner

*Primary Examiner* — Liangsche A Wang
*Assistant Examiner* — Cheikh Ndiaye
(74) *Attorney, Agent, or Firm* — Thomas E. Lees, LLC

(57) ABSTRACT

An apparatus, system, and method are disclosed for retaining email response time trends. A send module determines a send time, the time that a user sends an email message to a recipient. A receive module determines a receive time, the time that the user receives a response from the recipient. A response time module determines a response time that corresponds to the email message based on an elapsed time between the send time and the receive time. A content identifier module determines a content identifier for the email message. A trend module determines a response time trend that corresponds to the recipient and the content identifier based on the response time and on a plurality of previous response times of the recipient. The plurality of previous response times correspond to a plurality of previous email messages between the user and the recipient that match the content identifier.

18 Claims, 4 Drawing Sheets

RETAINING EMAIL RESPONSE TIME TRENDS

BACKGROUND

1. Field of the Invention

This invention relates to response time trends and more particularly relates to retaining email response time trends.

2. Description of the Related Art

Unlike more traditional communication methods, certain electronic communication methods lack immediate feedback. When communicating verbally, one can hear and often see other participants in the conversation, and their responsiveness and availability can easily be gauged. When communicating via email, instant messaging, or online via blogs, forums, wiki's, or other collaboration tools, however, other participants can be located throughout the world, and traditional verbal and visual feedback is not available to gauge responsiveness and availability.

If an email message is urgent, it can be important to know when one can expect to receive a response, particularly where a short response is required. It can also be important to know how soon to follow up a sent email with an additional communication if a response is not received within a certain threshold. Sending multiple messages requesting the same response, when the recipient has not yet read the original message, can be inefficient and counterproductive for the sender. Likewise, unnecessarily delaying a response to an email message, or forgetting to respond, is also inefficient.

Other factors, such as time differences, conflicting schedules, and vacations, can also affect email responsiveness. These factors may be unknown to an email's sender, who may be futilely waiting for a response from an unavailable recipient. Traditionally, some email and instant messaging clients show an available/unavailable status that indicates whether or not a user is currently at their computer. While useful, the fact that a user is at their computer, does not necessarily mean that they will respond. Additionally, a user can typically override their status. A user may, in reality, be available and responsive, while their status is listed as unavailable, or unresponsive.

BRIEF SUMMARY

From the foregoing discussion, it should be apparent that a need exists for an apparatus, system, and method that retain email response time trends. Beneficially, such an apparatus, system, and method would determine response time trends of recipients based on previous response times and on schedule information of the recipients.

The present invention has been developed in response to the present state of the art, and in particular, in response to the problems and needs in the art that have not yet been fully solved by currently available email responsiveness metrics. Accordingly, the present invention has been developed to provide an apparatus, system, and method for retaining email response time trends that overcome many or all of the above-discussed shortcomings in the art.

The apparatus for retaining email response time trends is provided with a plurality of modules configured to functionally execute the necessary steps of determining and retaining email response time trends. These modules in the described embodiments include a send module, a receive module, a response time module, a content identifier module, a trend module, a schedule module, a history module, a storage module, and a custom module.

The send module, in one embodiment, is configured to determine a send time. In a further embodiment, the send time is a time that a user sends an email message to a recipient. The receive module, in one embodiment, is configured to determine a receive time. In another embodiment, the receive time is a time that the user receives a response to the email message from the recipient. In a further embodiment, the receive module is further configured to correlate the response with the email message based on a determined content identifier for the email message and a matching content identifier for the response. The response time module, in one embodiment, is configured to determine a response time corresponding to the email message. In a further embodiment, the response time is based on an elapsed time between the send time and the receive time.

The content identifier module, in one embodiment, is configured to determine a content identifier for the email message. In another embodiment, the content identifier is based on a subject matter of the email message. In one embodiment, one of the user and the recipient determines the content identifier for the sent message. In a further embodiment, the content identifier module is further configured to parse content from the email message and to compare the parsed content with content from the plurality of previous email messages to determine the content identifier. In another embodiment, the content identifier is based on metadata associated with the recipient.

The trend module, in one embodiment, is configured to determine a response time trend. In a further embodiment, the response time trend corresponds to the recipient. In another embodiment, the response time trend corresponds to the content identifier. In one embodiment, the response time trend is based on the response time and on a plurality of previous response times of the recipient. The plurality of previous response times, in one embodiment, corresponds to a plurality of previous email messages matching the content identifier. In a further embodiment, the trend module is further configured to associate a second response time trend with a second content identifier for a plurality of email messages between the user and the recipient.

In one embodiment, the response time trend comprises a minimum response time, an average response time, and a maximum response time for the recipient. In another embodiment, the trend module is further configured to determine a separate response time trend corresponding to different days of the week. In a further embodiment, each separate response time trend comprises an intraday response time trend for a corresponding day of the week.

The schedule module, in one embodiment, is configured to adjust the response time trend based on schedule information of the recipient. In another embodiment, the schedule information comprises a time zone of the recipient. In a further embodiment, the schedule information comprises one or more calendar items of the recipient. In one embodiment, the schedule module is further configured to analyze content of an email message sent from the recipient to the user to discover the schedule information.

The history module, in one embodiment, is configured to update the response time trend based on one or more stored email messages. In a further embodiment, the one or more stored email messages comprise email messages sent to the recipient and on corresponding stored response messages from the recipient.

The storage module, in one embodiment, is configured to store the response time trend in a data storage repository. In a further embodiment, the storage module is configured to store response time data corresponding to the email message in a data storage repository. The custom module, in one embodiment, is configured to determine a custom response time trend defined by a user. In a further embodiment, the custom module is configured to determine the custom response time trend based on the stored response time data.

A system of the present invention is also presented for retaining email response time trends. The system may be embodied by a data storage repository and a computing device. In particular, the computing device, in one embodiment, includes a response time module that is substantially similar to the apparatus described above.

The data storage repository, in one embodiment, is configured to store a plurality of email response time trends. In a further embodiment, each email response time trend is associated with an email recipient and an email content identifier. The computing device, in one embodiment, is in communication with the data storage repository. In a further embodiment, the computing device comprises a response time module that is configured to determine each of the plurality of email response time trends.

A method and a computer program product of the present invention are also presented for retaining email response time trends. The method and the operations of the computer program product in the disclosed embodiments substantially include the steps necessary to carry out the functions presented above with respect to the operation of the described apparatus and system.

In one embodiment, the method and the operations include determining a send time comprising a time that a user sends an email message to a recipient. In another embodiment, the method and the operations include determining a receive time comprising a time that the user receives a response to the email message from the recipient. In a further embodiment, the method and the operations include determining a response time corresponding to the email message based on an elapsed time between the send time and the receive time. The method and the operations, in another embodiment, include determining a content identifier for the email message. In a further embodiment, the method and the operations include determining a response time trend corresponding to the recipient and the content identifier based on the response time and on a plurality of previous response times for the recipient, the plurality of previous response times corresponding to a plurality of previous email messages matching the content identifier.

In a further embodiment, the method and the operations include adjusting the response time trend based on schedule information of the recipient. In another embodiment, the method and the operations include analyzing content of an email message sent from the recipient to the user to discover the schedule information.

The method and the operations, in one embodiment, include associating a second response time trend with a second content identifier for a plurality of email messages between the user and the recipient. In a further embodiment, the method and the operations include correlating the response with the email message based on the determined content identifier for the email message and a matching content identifier for the response. In another embodiment, the method and the operations include parsing content from the email message and comparing the parsed content with content from the plurality of previous email messages to determine the content identifier based on a subject matter of the email message.

In one embodiment, the method and the operations include storing the response time trend and response time data corresponding to the email message in a data storage repository. In another embodiment, the method and the operations include determining a custom response time trend defined by a user based on the stored response time data from the data storage repository. The method and the operations, in a further embodiment, include determining a separate response time trend corresponding to different days of the week.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
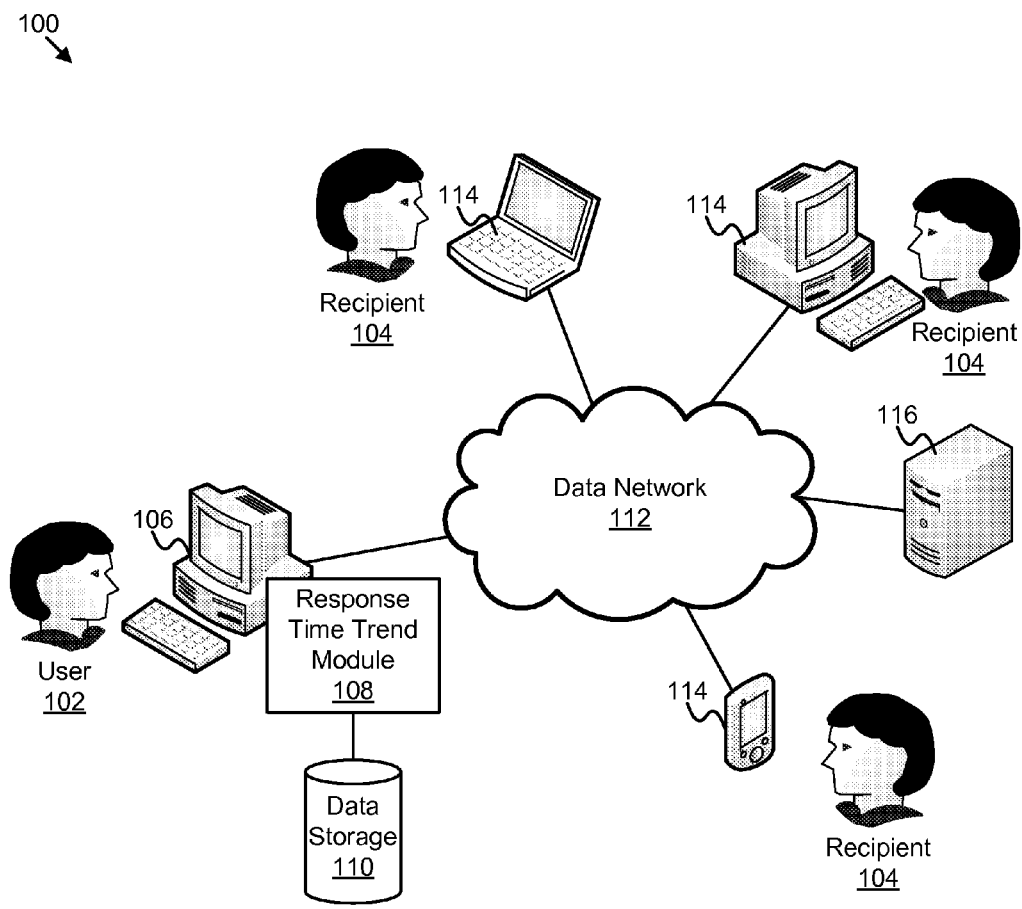
FIG. 1 is a schematic block diagram illustrating one embodiment of a system for retaining email response time trends in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a system 100 for retaining email response time trends. In general, the system 100 determines and retains email response time trends of one or more recipients 104 for a user 102. In the depicted embodiment, the system 100 comprises a user computing device 106, a response time trend module 108, a data storage repository 110, a data network 112, one or more recipient computing devices 114, an email server 116.

In one embodiment, the user 102 is an email user that sends email messages to and receives email messages from the one or more recipients 104. The user 102, in one embodiment, uses an email client application on the user computing device 106 to send and to receive email messages. The email client application may comprise a software application installed on the user computing device 106, a network or web application that is accessible to the user 102 on the user computing device 106, or another application that allows the user 102 to send and receive email messages. The user computing device 106 comprises a processor and a memory that store and execute program code. The computing device 106, for example, may comprise a desktop computer, a laptop computer, a cellular telephone, a personal digital assistant, a portable gaming or multimedia device, and the like.

To send and receive email messages, the user computing device is connected to the data network 112. The data network 112 may comprise a public or private, local or wide area, data network. In one embodiment, the data network 112 comprises the Internet. The email client application on the user computing device 106 may send and receive email messages through the email server 116, using the Simple Mail Transfer Protocol ("SMTP"), the Post Office Protocol ("POP"), the Internet Message Access Protocol ("IMAP"), or another email protocol. The email server 116 is connected to the data network 112, and is in communication with the user computing device 106. In one embodiment, the email server 116 may comprise a plurality of email servers that transfer email messages between the user 102 and the one or more recipients 104.

Each of the one or more recipients 104 may send and receive email messages using the recipient computing devices 114. In one embodiment, the recipient computing devices 114 each comprise a processor and a memory that store and execute program code. The recipient computing devices 114 may be substantially similar to the user computing device 106 described above. Each of the recipient computing devices 114 is connected to the data network 112, such that the recipient computing devices 114 can send and receive email messages through the email server 116 and/or other email servers.

In one embodiment, the response time trend module 108 determines response time trends for the one or more recipients 104. As used herein, recipient refers to either a single recipient or a group of recipients sharing a common attribute (i.e. all recipients of the marketing group). The response time trend module 108 may be integrated with, installed on, or otherwise in communication with the user computing device 106 and/or the email server 116. In one embodiment, the response time trend module 108 is integrated with the email client application that is installed on or accessible from the user computing device 106. The response time trend module 108 may determine response time trends of the one or more recipients 104 specifically for the user 102, or, in another embodiment, may determine response time trends of the one or more recipients 104 relative to a plurality of users 102. In one embodiment, the response time trend module 108 is local to the user computing device 106, and determines response time trends for the one or more recipients 104 relative to the user 102 based on email messages accessible to the user 102. In this manner, the response time trend module 108 can determine response time trends for the user 102 without extra interactions with or privacy intrusions on the one or more recipients 104.

A response time trend comprises a general tendency or course of behavior for a given recipient or group of recipients relating to an amount of time taken for one of or a group of the one or more recipients 104 to respond to an email message from the user 102. Example time information that defines a response time trend may include a minimum response time of a recipient, an average response time of a recipient, a maximum response time of a recipient, or the like.

A response time trend may be general, or may be specific to a predefined time or time period. For example, a response time trend may be specific to a time of day or a day of the week. A response time trend may also take schedule information of a recipient into account. A response time trend may also be specific to a content identifier for the sent and received email messages, such as a work email response time trend and a personal email response time trend.

"Content identifier," as used herein, means an identifier for an attribute of an associated email message. A content identifier may identify a principle subject matter of an associated email message, a type or number of attachments included in an associated email message, a priority level of an associated email message, one or more classifications of an associated email message, one or more user defined tags for an associated email message, or other attributes of an associated email message. In a further embodiment, a content identifier may be selected from a hierarchy of content identifiers, or the like. An email message may have a single content identifier, or may have a plurality of content identifiers. Content identifiers may be determined by the user 102, a recipient 104, or by the response time trend module 108. The response time trend module 108 is discussed in greater detail with regard to FIG. 2.

In one embodiment, the response time trend module 108 is in communication with the data storage repository 110. In one embodiment, the data storage repository 110 comprises non-volatile data storage, such as magnetic storage, optical storage, flash storage, and/or other types of data storage. The data storage repository 110 may be installed on or in communication with the user computing device 106, with the mail server 116, or may otherwise be in communication with the response time trend module 108. In one embodiment, the response time trend module 108 is in communication with the data storage repository 110 over the data network 112. In a further embodiment, the data storage repository 110 may comprise a data structure, or data storage software, such as a database, a data file, or the like.

The response time trend module 108, in one embodiment, may store response time trends on the data storage repository 110. The response time trend module 108 may store the response time trends in one or more mail files of the user 102, such as a mailbox file, individual email files, a configuration file, a metadata file, or the like, or in an independent data structure or file. The response time trend module 108, in another embodiment, may store other response time information, such as individual email response times, historical response time data, and the like on the data storage repository 110.

Figure 2:
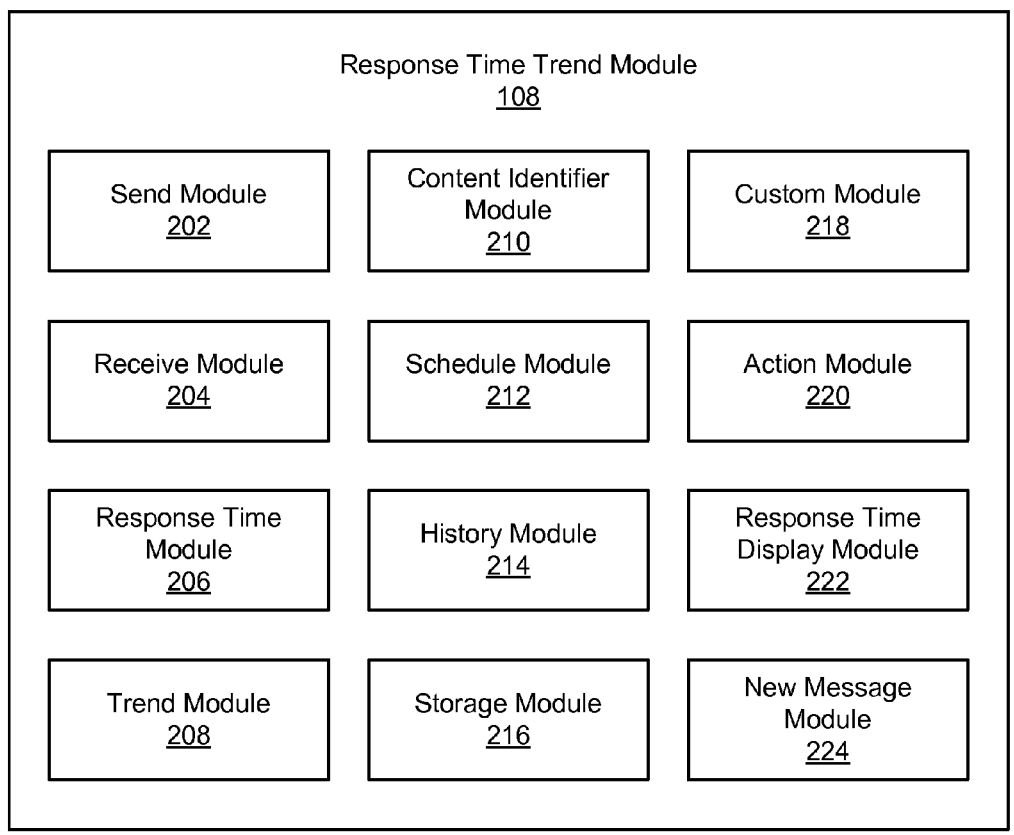
FIG. 2 is a schematic block diagram illustrating one embodiment of a response time trend module in accordance with the present invention.

FIG. 2 depicts one embodiment of the response time trend module 108. In the depicted embodiment, the response time trend module 108 comprises a send module 202, a receive module 204, a response time module 206, a trend module 208, a content identifier module 210, a schedule module 212, a history module 214, a storage module 216, a custom module 218, an action module 220, a response time display module 222, and a new message module 224.

In one embodiment, the send module 202 determines a time that the user 102 sends an email message to a recipient 104, or the send time of the email message. The send module 202 may determine the send time in response to the user 102 sending the email message, or may determine the send time that the user 102 previously sent the email message using email header data, metadata in a mail file, an archived copy of the email message, or the like.

In one embodiment, the receive module 204 determines a time that the user 102 receives a response to the email message from the recipient 104, or the receive time of the response. Like the send module 202, the receive module 204 may determine the receive time in response to the user 102 receiving the response to the email message, or may determine the receive time that the user 102 previously received the response using email header data, metadata in a mail file, an archived copy of the email message, or the like.

In a further embodiment, the receive module 204 determines that a received email message is a response to the previously sent email message, correlating the response and the email message. In one embodiment, the receive module 204 correlates the next email message from the recipient 104 to the sender with the previously sent email message. In another embodiment, the receive module 204 may use one or more identifiers, such as a 'Message-ID' or 'In-Reply-To' header field or the like, a subject field, a matching recipient/sender, a matching content identifier for the email messages, and the like to correlate a response message with the email message.

In one embodiment, the content identifier module 210 described below determines a content identifier for the sent message and for the received email message. In a further embodiment, the receive module 204 uses the content identifier for a received email message and one or more additional aspects of the received email message to determine that the received email is a response to the previously sent email message even if a 'Message-ID,' a sender's email address, a subject field, or the like does not match. In this manner, the response time trend module 108 can determine a reliable response time trend, even when a response is sent by the recipient 104 from a different email account, is not a direct reply, does not share a common subject field, or the like.

In one embodiment, the receive module 204 may determine that certain predefined types of emails are not valid responses. For example, in one embodiment, the receive module 204 may recognize a received email as a delivery receipt, a read receipt, an auto-reply, an out-of-office reply, an automated message, or the like, and may determine that the received email is not a valid response to the email message. As described below, in one embodiment, the schedule module 212 may adjust a response time trend based on a received email, even if the received email is not a valid response to the email message, for greater accuracy in determining response time trends. In a further embodiment, the schedule module 212 may adjust a response time trend by excluding response time information from the response time trend in response to receiving an out-of-office reply, or the like, such that the response time trend is not improperly skewed by an abnormally long response time.

In one embodiment, the response time module 206 determines a response time corresponding to the email message. The response time module 206 bases the response time on an elapsed time or difference in time between the send time that the send module 202 determines and the receive time that the receive module 204 determines. The response time, in one embodiment, is specific to the email message, the user 102, and the recipient 104. In a further embodiment, the response time is also specific to a content identifier that the content identifier module 210 determines for the email message. The response time module 206 may mark, flag, or otherwise identify the response time as corresponding to the user 102, the recipient 104, and/or the content identifier.

In one embodiment, the trend module 208 uses the response time that the response time module 206 determines to determine a response time trend that corresponds to the recipient 104. In another embodiment, the response time trend also corresponds to a determined content identifier for the email message. The trend module 208 may also use a plurality of previous response times of the recipient, determined based on a plurality of previous email messages between the user 102 and the recipient 104. In one embodiment, the plurality of previous email messages that the trend module 208 uses to determine the response time trend match the determined content identifier for the email message.

A response time trend comprises historical response time information corresponding to the recipient 104. In one embodiment, a response time trend may comprise discrete values, such as a minimum response time, an average response time, a maximum response time, and the like. An average response time may comprise a mean, a median, a mode, or another average-type representation of historical response times of the recipient 104. In another embodiment, the response time trend may comprise an equation, function, graph, map, table, or the like of historical response times, or of average response times.

The trend module 208, in one embodiment, may determine separate response time trends for various time periods, such as each day of the week, or the like. In a further embodiment, response time trends may be based on or indexed by send times of email messages from the user 102 to the recipient 104. A response time trend may further comprise an intraday response time trend, representing response time trends of the recipient 104 throughout an individual day. In another embodiment, the trend module 208 may determine response time trends based on other factors, such as trends for the most recent week, month, year, or the like, a received time of a read receipt, a number of recipients, a length of the email message, a priority or urgency level of the email message, and the like.

For example, in one embodiment, a response time trend for the recipient 104 may comprise a data structure, such as a table, an array, a list, or the like, that holds various response time values for discrete periods of time, such as a minimum, average, and maximum response time for every day, every hour, every fifteen minutes, or the like. A response time trend may comprise a plurality of data structures, for example, one for each day of the week, for each hour, for each content identifier, or the like. Response time trends, in another embodiment, may be marked, tagged, indexed, or otherwise identified by a corresponding recipient, content identifier, time period, send time, receive time, and/or other characteristic to increase the accessibility and usability of the response time trends.

In one embodiment, a response time trend relates to email communication between the user 102 and the recipient 104. In a further embodiment, a response time trend may relate to email communications between a plurality of users and the recipient 104, or to email communications between the user 102 and a plurality of recipients 104. A response time trend, in another embodiment, may relate to email communications between a plurality of users and a plurality of recipients based on a separate factor, such as a content identifier for email messages, a classification of user or recipient, a time period, send times, receive times, and the like.

In one embodiment, the content identifier module 210 determines a content identifier for the email message. A content identifier is an identifier that represents an attribute of the email message. The content identifier may originate from or include terms or phrases from the subject line or body of the email message or comprise an identifier representative of an attribute of the email message such as a principle subject matter for the email message, a type or number of attachments included in the email message, a priority level of the email message, a classification of the email message, a user defined tag for the email message, or another attribute of the email message. As an identifier, a content identifier may comprise a tag or category assigned to the email message, one or more words or phrases parsed from the email message, a characteristic of the email message, or the like. Content identifiers may be arranged in a hierarchy, with sub-content identifiers having greater specificity than parent content identifiers. The content identifier module 210 may determine a content identifier for the email message and for a received email to assist the receive module 204 in determining that the received email is a response to the email message.

In one embodiment, a user, such as the user 102 or the recipient 104, determines a content identifier for the sent email message. The content identifier module 210, in one embodiment, may provide the user a list of content identifiers, and the user may select one or more of the content identifiers for the email message. In another embodiment, a user may input one or more content identifiers for the email message, for example by entering the content identifiers into a content tagging interface or the like that the content identifier module 210 presents to the user. The user 102, in one embodiment, may provide the content identifier for the sent email message during composition of the sent email message. In another embodiment, the recipient 104 may provide the content identifier for the sent email message during composition of a response to the sent email message.

In a further embodiment, the content identifier module 210 parses content from the email message to determine a content identifier for the email message. The content identifier module 210 may search or scan the email message for one or more predefined words or phrases, may count or index words found in the email message, or may otherwise parse content from the email message such that the content identifier module 210 can compare parsed content from the email message with content from previous email messages to determine the content identifier. The content identifier module 210, in a further embodiment, may use a specific portion of the email message, such as the subject line, a signature, or the like, to determine a content identifier for the email message.

In one embodiment, the content identifier module 210 may base the content identifier on a subject matter of the email message as recited in the subject field of the email message or parsed from the body of the email message. In another embodiment, the content identifier module 210 may base the content identifier on another attribute of the email message, such as a number or type of attachments, an email type, such as forward, reply, or new, a length of the email message, or on other attributes. In one example embodiment, the content identifier module 210 may determine that email messages with words like "lunch," "movie," "game," "vacation," and the like have a "personal" content identifier, while email messages with words like "deadline," "report," "meeting," "draft," and the like have a "work" content identifier. In a further embodiment, the content identifier module 210 may select one or more words or phrases from an email message as a content identifier for the email message. In another embodiment, the content identifier module 210 may determine multiple content identifiers for a single email message.

The content identifier module 210, in a further embodiment, may determine the content identifier based on metadata associated with the recipient 104. For example, in one embodiment, the content identifier module 210 may maintain or access metadata defining certain recipients as "work" contacts, others as "family" contacts, and others as "friend" contacts, or the like, and may determine the content identifier based on the metadata. The content identifier module 210 may access recipient metadata in an address book, a directory, in emails to or from a recipient, in a mail file, or in another location accessible to the content identifier module 210.

In one embodiment, the trend module 208 determines response time trends based on content identifier. For example, the trend module 208 may determine a plurality of response time trends for a single recipient 104, based on a plurality of response times that the content identifier module 210 identifies in responses from the recipient 104. In that manner, if the recipient 104 tends to respond more quickly to email messages of a particular content identifier, and less quickly to email messages of another, the trend module 208 will accurately represent that fact in separate response time trends for each content identifier, both separate response time trends corresponding to the same recipient 104.

In one embodiment, the schedule module 212 adjusts the response time trend that the trend module 208 determines based on schedule information of the recipient 104. Schedule information comprises data that indicates a past, present, or future availability or unavailability of the recipient 104. Schedule information, in one embodiment, may comprise a time zone of the recipient 104, calendar items of the recipient 104, a location of the recipient 104, or other information relating to the availability or responsiveness of the recipient 104. Examples of calendar items, in one embodiment, include meetings, appointments, holidays, vacations, meals, breaks, trips, work hours, and the like. The schedule module 212, in one embodiment, retrieves schedule information of the recipient 104 from a shared calendar over the data network 112. In another embodiment, the schedule module 212 discovers schedule information using a content analysis of an email message. For example, the schedule module 212, in one embodiment, may parse schedule information from an "out of office" email response, a meeting request email, a flight itinerary email, an event invitation email, and the like.

Adjusting the response time trend may comprise altering the response time trend, adding information to the response time trend, removing a response time from the response time trend, or otherwise adjusting the response time trend based on schedule information. For example, the schedule module 212, in one embodiment, may adjust a response time trend to reflect an event that that the recipient 104 has scheduled, may add information about the event to the response time trend, may make a copy of the response time trend and adjust the copy to reflect the event, or the like. In a further embodiment, the schedule module 212 may adjust a response time trend by excluding one or more response times from the response time trend in response to schedule information, such that the response time trend is not improperly skewed by an abnormally long response time relating to the schedule information.

In one embodiment, the history module 214 updates the response time trend based on one or more stored email messages sent to the recipient 104 and on one or more corresponding stored response messages from the recipient 104. The stored emails may comprise archived emails, imported emails, or other previously sent emails that are accessible to the history module 214. In one embodiment, the stored email messages comprise emails sent from the user 102 to the recipient 104. In another embodiment, the stored email messages comprise email messages having a certain content identifier, email messages from a certain classification or group of senders, or another related group of email messages.

By updating the response time trend based on stored email messages, the history module 214 increases the accuracy of the response time trend for the recipient 104 without waiting for additional future correspondence. In one embodiment, the send module 202, the receive module 204, the response time module 206, the trend module 208, and/or the content identifier module 210 assist the history module 214 in updating the response time trend, substantially as described above.

In one embodiment, the storage module 216 stores the response time trend in the data storage repository 110. In a further embodiment, the storage module 216 stores response time data corresponding to the email message in the data storage repository 110. Response time data corresponding to the email message, in one embodiment, may comprise the send time of the email message, the receive time of the email message, the response time of the recipient 104, and/or other data associated with the email message and the response.

The storage module 216, in one embodiment, may store the response time trend and/or the response time data in a manner such that the information is accessible using a recipient, content identifier, time period, send time, receive time, and/or other characteristic as an identifier or key. For example, the storage module 216 may store the response time trend and/or the response time data in a database or data structure that is indexed or keyed by one or more characteristics.

In one embodiment, the custom module 218 determines a custom response time trend based on the response time data that the storage module 216 stores. The custom response time trend, in one embodiment, is defined by a user, such as the user 102. The custom module 218, in one embodiment, may allow custom access to response time data, providing more specific trends than those that the trend module 208 determines. For example, the custom module 218, in one embodiment, may search, scan, or query response time data to determine a custom response time trend based on user-selected parameters, such as send time, receive time, sender, content identifier, number of recipients, attachments, message priority, and the like. The custom module 218 may present the custom response time trend to the user 102, may store the custom response time trend, may adjust a response time trend based on the custom response time trend, or may perform another action with the custom response time trend.

In one embodiment, the action module 220 suggests an action to the user 102 relative to the recipient 104 based on the response time trend corresponding to the recipient 104. The action may comprise a suggested time for the user 102 to make additional contact with the recipient 104, a suggested method of contact for the user 102 to use to contact the recipient 104, such as email, telephone, or instant message contact, or the like. For example, in one embodiment, the action module 220 may suggest that the user 102 wait before sending an additional email to the recipient 104, until after a minimum, average, or maximum response time of the recipient 104 has passed, or may suggest that the user 102 contact the recipient 104 once a minimum, average, or maximum response time of the recipient 104 has passed.

In one embodiment, the response time display module 222 displays a list of email messages and displays a visual representation of a plurality of response time trends corresponding to a sender or recipient of the email messages. The response time display module 222 displays the visual representations such that each visual representation is visually associated with at least one of the email messages. A visual representation of a response time trend, in one embodiment, may comprise a color representing the response time trend, a number representing a minimum, average, maximum, or estimated response time, a graph, an icon, a marking on or around the email message, such as a highlighting, underlining, bolding, or italicizing the email message in the list, or another visual representation. Different representations may be given different meanings For example, in an embodiment where colors are used as a visual representation, green may be defined as representing a low range of response time trends, yellow a middle range, and red a high range.

In one embodiment, the response time display module 222 displays a list of emails received by the user 102, and displays a visual representation for each email in the list representing a response time trend of the sender of the email. This allows the user 102, optionally, to reciprocate or prioritize responses to received emails based on the response time trends of the received emails' senders. In another embodiment, the response time display module 222 displays a list of email sent by the user 102, and displays a visual representation of an estimated response time for each sent email in the list, based on response time trends of the recipients.

In one embodiment, the new message module 224 assists the user 102 in composing a new email message and dynamically determines an estimated response time for the new email message. The estimated response time, in one embodiment, is based on response time trends of recipients of the new email message. The new message module 224, in a further embodiment, dynamically updates the estimated response time as the user 102 adds or removes recipients, and may suggest additional recipients based on a content identifier for the new messages, based on other recipients, or based on reducing the estimated response time for the new email message.

Figure 3:
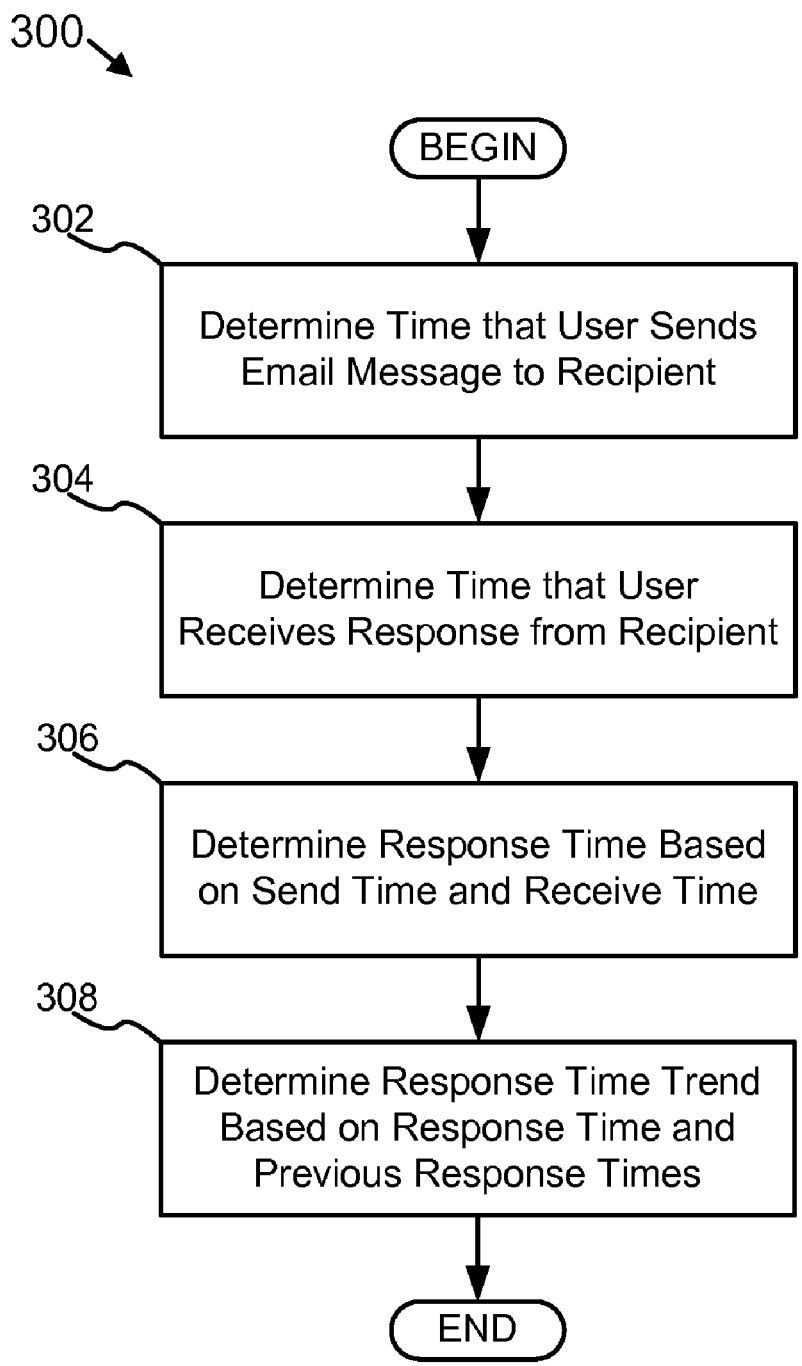
FIG. 3 is a schematic flow chart diagram illustrating one embodiment of a method for retaining email response time trends in accordance with the present invention.

FIG. 3 depicts one embodiment of a method 300 for retaining email response time trends. The method 300 begins, and the send module 202 determines 302 a send time for an email message that the user 102 sends to a recipient 104. The receive module 204 determines 304 a receive time for a response that the user 102 receives to the email message from the recipient 104.

The response time module 206 determines 306 a response time for the email message based on an amount of time that elapses between the send time and the receive time. The trend module 208 determines 308 a response time trend for the recipient 104 based on the response time and on previous response times of the recipient 104, and the method 300 ends.

Figure 4:
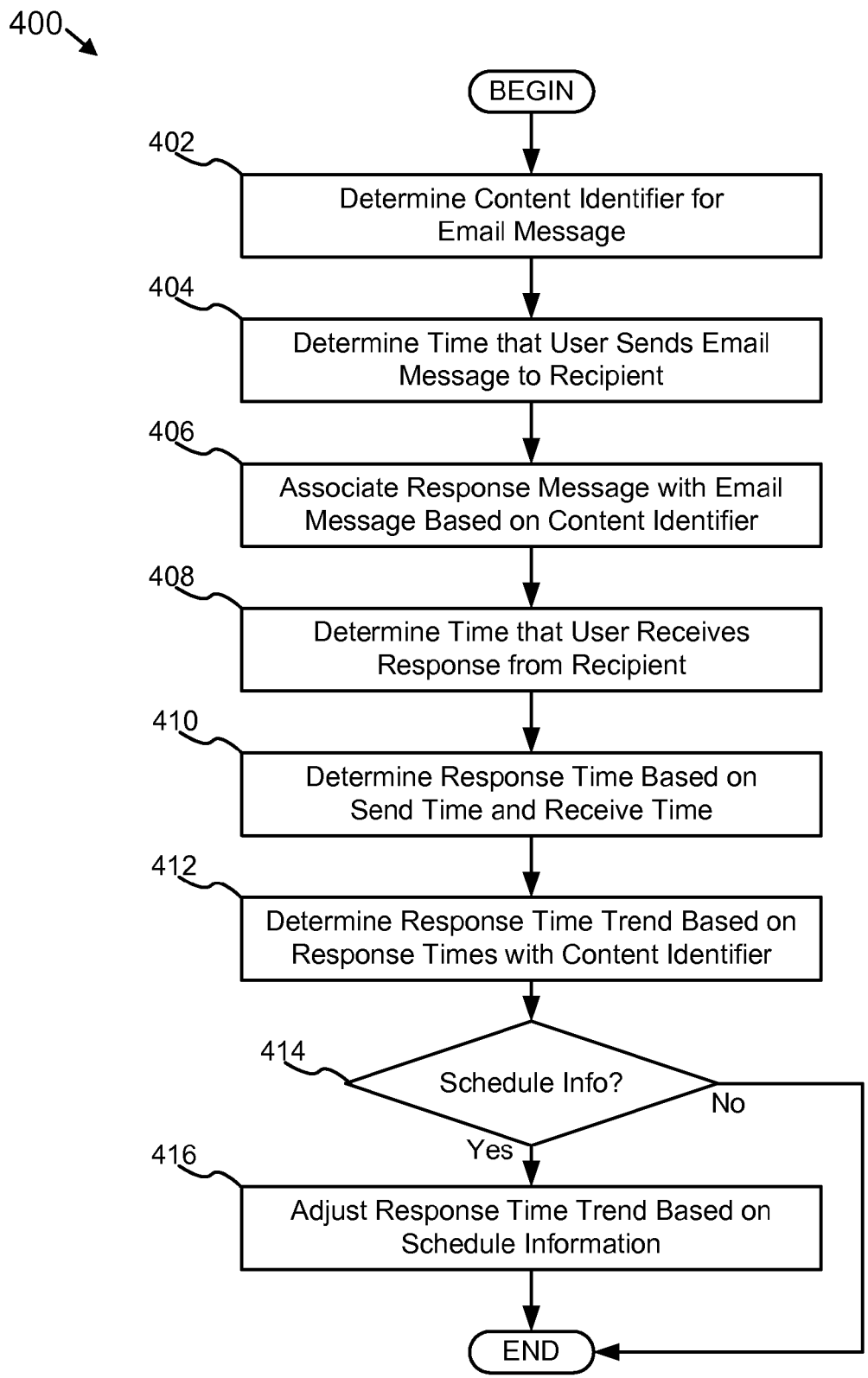
FIG. 4 is a schematic flow chart diagram illustrating another embodiment of a method for retaining email response time trends in accordance with the present invention.

FIG. 4 depicts one embodiment of a method 400 for retaining email response time trends based on content identifier. The method 400 begins, and the content identifier module 210 determines 402 a content identifier for an email message from the user 102 to a recipient 104. The send module 202 determines 404 a send time for the email message, comprising the time that the user 102 sends the email message to the recipient 104. The receive module 204 associates 406 a response message with the email message based on a matching content identifier for both email messages. The receive module 204, in another embodiment, may further base the association of email message and response message on an 'In-Reply-To' field, a 'Message-ID' field, or the like, as described above. The receive module 204 determines 408 a receive time for the response message.

The response time module 206 determines 410 a response time for the email message based on an amount of time that elapses between the send time and the receive time. The trend module 208 determines 412 a response time trend for the recipient 104 based on the response time and on previous response times of the recipient 104 that have a matching content identifier.

The schedule module 212 determines 414 whether or not schedule information is available for the recipient 104, based on contents of the response email, a shared calendar, or the like. If the schedule module 212 determines 414 that there is schedule information available for the recipient 104, the schedule module 212 adjusts 416 the response time trend based on the schedule information, and the method 400 ends. If the schedule module 212 determines 414 that no schedule information is available for the recipient 104, the method 400 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to retain email response time trends, the method comprising:
   determining a send time comprising a time that a user sends an email message to a recipient;
   determining a receive time comprising a time that the user receives a response to the email message from the recipient;
   determining a response time corresponding to the email message based on an elapsed time between the send time and the receive time;
   determining a content identifier for the email message based on subject matter of the email message;
   determining a response time trend corresponding to the recipient and the content identifier based on the response time and on a plurality of previous response times for the recipient, the plurality of previous response times corresponding to a plurality of previous email messages matching the content identifier;
   storing the response time trend and response time data corresponding to the email message in a data storage repository; and
   determining a custom response time trend defined by a user based on the stored response time data from the data storage repository.

2. The method of claim 1, further comprising adjusting the response time trend based on schedule information of the recipient.

3. The method of claim 2, wherein the schedule information comprises a time zone of the recipient.

4. The method of claim 2, wherein the schedule information comprises one or more calendar items of the recipient.

5. The method of claim 2, further comprising analyzing content of an email message sent from the recipient to the user to discover the schedule information.

6. The method of claim 1, further comprising associating a second response time trend with a second content identifier for a plurality of email messages between the user and the recipient.

7. The method of claim 1, further comprising correlating the response with the email message based on the determined content identifier for the email message and a matching content identifier for the response.

8. The method of claim 1, wherein one of the user and the recipient determines the content identifier for the sent email message.

9. The method of claim 1, further comprising parsing content from the email message and comparing the parsed content with content from the plurality of previous email messages to determine the content identifier based on a subject matter of the email message.

10. The method of claim 1, wherein determining the content identifier is based on metadata associated with the recipient.

11. The method of claim 1, wherein the response time trend comprises a minimum response time, an average response time, and a maximum response time for the recipient.

12. The method of claim 1, further comprising determining a separate response time trend corresponding to different days of the week.

13. The method of claim 12, wherein each separate response time trend comprises an intraday response time trend for a corresponding day of the week.

14. An apparatus to retain email response time trends, the apparatus comprising:

a send module configured to determine a send time comprising a time that a user sends an email message to a recipient;

a receive module configured to determine a receive time comprising a time that the user receives a response to the email message from the recipient;

a response time module configured to determine a response time corresponding to the email message based on an elapsed time between the send time and the receive time;

a content identifier module configured to determine a content identifier for the email message, the content identifier based on a subject matter of the email message;

a trend module configured to determine a response time trend corresponding to the recipient and the content identifier based on the response time and on a plurality of previous response times of the recipient, the plurality of previous response times corresponding to a plurality of previous email messages matching the content identifier;

a storage module configured to store the response time trend and response time data corresponding to the email message; and a custom module configured to determine a custom response time trend defined by a user based on the stored response time data.

15. The apparatus of claim 14, further comprising a schedule module configured to adjust the response time trend based on schedule information of the recipient, the schedule information comprising a time zone of the recipient and one or more calendar items of the recipient.

16. The apparatus of claim 14, further comprising a history module configured to update the response time trend based on one or more stored email messages sent to the recipient and on one or more corresponding stored response messages from the recipient.

17. A computer-readable storage device with an executable program stored thereon, wherein the program instructs a processor to perform:

determining a send time comprising a time that a user sends an email message to a recipient;

determining a receive time comprising a time that the user receives a response to the email message from the recipient;

determining a response time corresponding to the email message based on an elapsed time between the send time and the receive time;

determining a content identifier for the email message; and determining a response time trend corresponding to the recipient and the content identifier based on the response time and on a plurality of previous response times for the recipient, the plurality of previous response times corresponding to a plurality of previous email messages matching the content identifier.

18. An apparatus to retain email response time trends, the apparatus comprising:

a send module configured to determine a send time comprising a time that a user sends an email message to a recipient;

a receive module configured to determine a receive time comprising a time that the user receives a response to the email message from the recipient;

a response time module configured to determine a response time corresponding to the email message based on an elapsed time between the send time and the receive time;

a content identifier module configured to determine a content identifier for the email message, the content identifier based on a subject matter of the email message;

a trend module configured to determine a response time trend corresponding to the recipient and the content identifier based on the response time and on a plurality of previous response times of the recipient, the plurality of previous response times corresponding to a plurality of previous email messages matching the content identifier;

a schedule module configured to adjust the response time trend based on schedule information of the recipient, the schedule information comprising a time zone of the recipient and one or more calendar items of the recipient;

a history module configured to update the response time trend based on one or more stored email messages sent to the recipient and on one or more corresponding stored response messages from the recipient;

a storage module configured to store the response time trend and response time data corresponding to the email message; and a custom module configured to determine a custom response time trend defined by a user based on the stored response time data.

* * * * *